Dec. 26, 1967 O. HERMANN 3,359,816

DIGITAL SELECTOR

Filed Feb. 4, 1966 10 Sheets-Sheet 1

INVENTOR
Otto Hermann
BY
Wood, Herron and Evans
ATTORNEYS

Dec. 26, 1967 O. HERMANN 3,359,816

DIGITAL SELECTOR

Filed Feb. 4, 1966 10 Sheets-Sheet 2

INVENTOR
Otto Hermann
BY
Wood, Herron and Evans
ATTORNEYS

INVENTOR
Otto Hermann
BY
Wood, Herron and Evans
ATTORNEYS

Dec. 26, 1967 O. HERMANN 3,359,816

DIGITAL SELECTOR

Filed Feb. 4, 1966 10 Sheets-Sheet 4

INVENTOR
Otto Hermann
BY
Wood, Herron and Evans
ATTORNEYS

INVENTOR
Otto Hermann
BY
Wood, Herron and Evans
ATTORNEYS

Dec. 26, 1967 O. HERMANN 3,359,816

DIGITAL SELECTOR

Filed Feb. 4, 1966 10 Sheets-Sheet 6

INVENTOR
Otto Hermann
BY
Wood, Herron and Evans
ATTORNEYS

INVENTOR
Otto Hermann
BY
Wood, Herron and Evans
ATTORNEYS

INVENTOR
Otto Hermann
BY
Wood, Herron and Evans
ATTORNEYS

Dec. 26, 1967 O. HERMANN 3,359,816

DIGITAL SELECTOR

Filed Feb. 4, 1966 10 Sheets-Sheet 9

INVENTOR
Otto Hermann
BY
Wood, Herron and Evans
ATTORNEYS

| SPD | SOLENOID 1 | 2 | 3 | 4 | 5 | 6 |
|---|---|---|---|---|---|---|
| NEU | | | | | | |
| 1 | X | | | | | |
| 2 | | X | | | | |
| 3 | X | X | | | | |
| 4 | | | X | | | |
| 5 | X | | X | | | |
| 6 | | X | X | | | |
| 7 | X | X | X | | | |
| 8 | | | | X | | |
| 9 | X | | | X | | |
| 10 | | X | | X | | |
| 11 | X | X | | X | | |
| 12 | | | X | X | | |
| 13 | X | | X | X | | |
| 14 | | X | X | X | | |
| 15 | X | X | X | X | | |
| 16 | | | | | X | |
| 17 | X | | | | X | |
| 18 | | X | | | X | |
| 19 | X | X | | | X | |
| 20 | | | X | | X | |
| 21 | X | | X | | X | |
| 22 | | X | X | | X | |
| 23 | X | X | X | | X | |
| 24 | | | | X | X | |
| 25 | X | | | X | X | |
| 26 | | X | | X | X | |
| 27 | X | X | | X | X | |
| 28 | | | X | X | X | |
| 29 | X | | X | X | X | |
| 30 | | X | X | X | X | |
| 31 | X | X | X | X | X | |
| 32 | | | | X | X | X |
| 33 | X | | | X | X | X |
| 34 | | X | | X | X | X |
| 35 | X | X | | X | X | X |
| 36 | | | X | X | X | X |

INVENTOR
Otto Hermann
BY
Wood, Herron and Evans
ATTORNEYS 3,359,816
DIGITAL SELECTOR Otto Hermann, Cincinnati, Ohio, assignor to The R. K. Le Blond Machine Tool Company, Cincinnati, Ohio, a corporation of Delaware Filed Feb. 4, 1966, Ser. No. 525,084
12 Claims. (Cl. 74—335)

Figure 1:
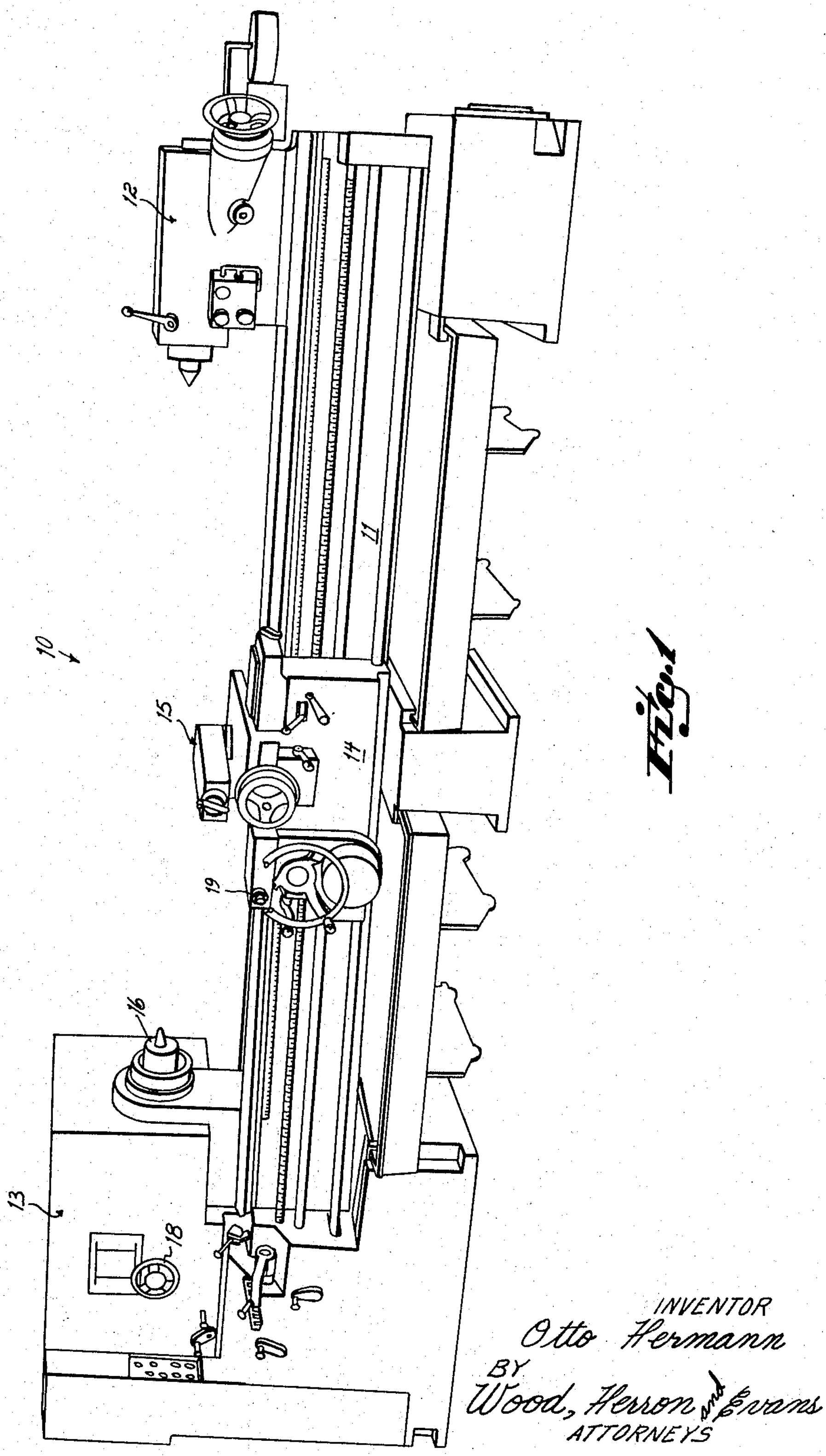

This invention relates to a position selector and more particularly, to a transmission speed selector of the type which utilizes discrete location of a selector valve to control transmission speed.

It has been a primary objective of this invention to provide an improved digital selector for locating a movable member in any preselected one of a multiplicity of positions.

Another objective of this invention has been to provide an improved remote control transmission speed selector for shifting a plurality of gears into a multiplicity of transmission speed determinative positions.

Prior to this invention, it has been the practice of the machine tool industry to use a plurality of remotely controlled solenoid operated valves in order to remotely control the positioning of a plurality of gear shifting hydraulic motors in large, multiple speed transmissions. This invention represents a departure from conventional multiple solenoid-valve systems in that it utilizes a single, remotely controlled, shifter valve plate to control a plurality of speed determinative gear shifting hydraulic motors. Accurate positioning of this valve in a large number of speed selection positions is effected by a unique remotely controlled digital selector unit.

This digital selector unit comprises a plurality of binarily related positioning elements or blocks selectively movable into juxtaposition in an axis of alignment to form a stack having a dimension along the axis of alignment which is a binary function of the selected blocks. The additive dimension of the selected elements of the stack is determinative of the position of the valve plate and thus of the hydraulic motors which in turn position the gears of the transmission.

Remote control of the blocks and thus of the transmission is derived from a plurality of block actuator solenoids operative to selectively move the blocks into and out of the axis of alignment. The solenoids are controlled from a remotely located dial, push button control console unit, or other conventional multiple position electrical actuator.

One advantage of this digital selector or positioner over other types of multiple block selectors is the higher number of discrete positions available from a selected number of blocks. Because of the relatively small number of blocks required to provide a relatively large number of available stop positions, the control system required for moving the elements into and out of the active position is much less expensive and complex than other selectors having a comparable number of stop positions.

The primary advantage of this transmission control system over conventional multiple solenoid-valve transmission control systems is that it is more positive in its operation and less expensive to manufacture. Additionally, because of the different types of solenoids utilized and the different environment in which the solenoids operate, the failure rate of the solenoids in the present control system is much less than in conventional solenoid-valve transmission control systems.

Figure 2:
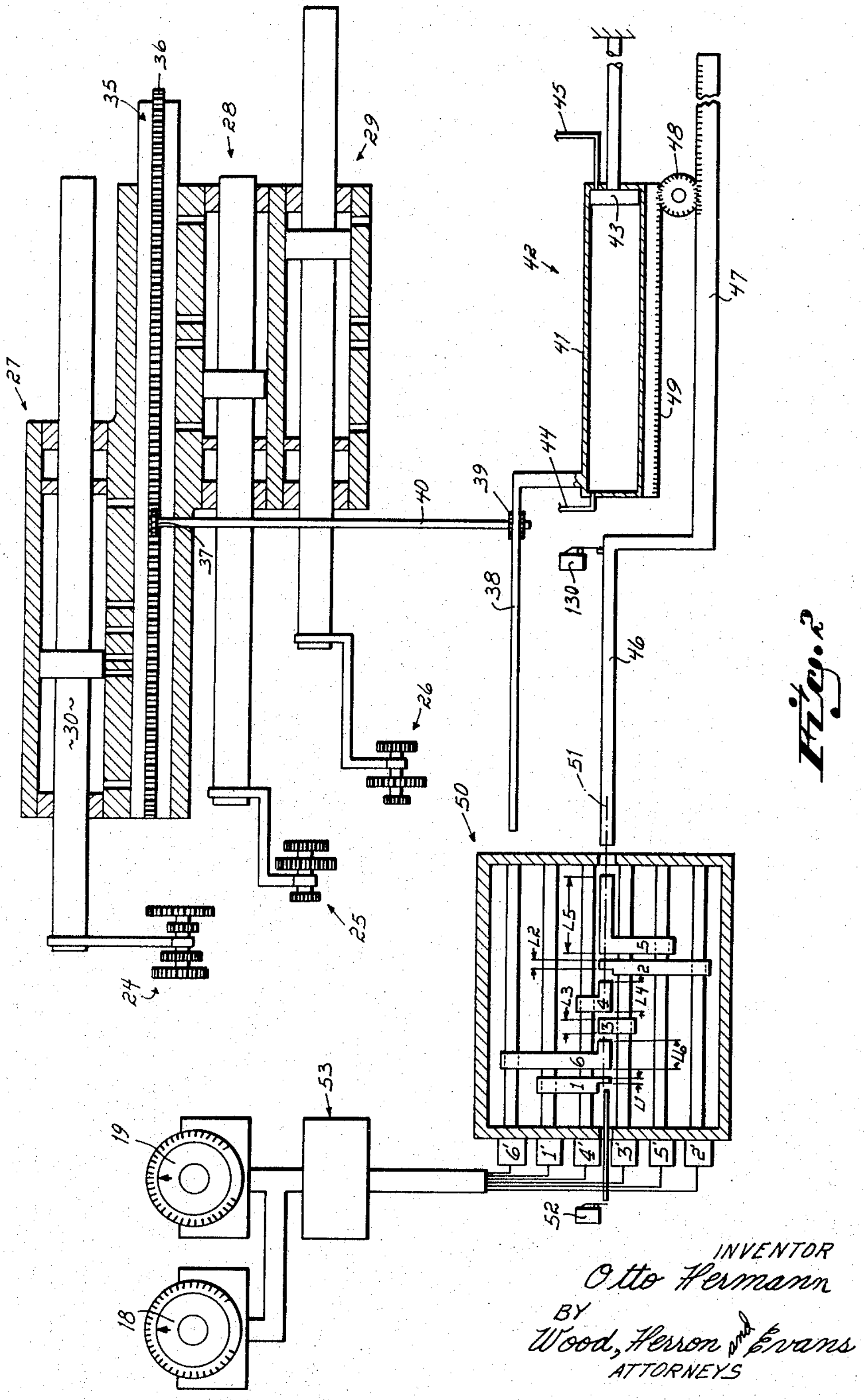
Figure 3:
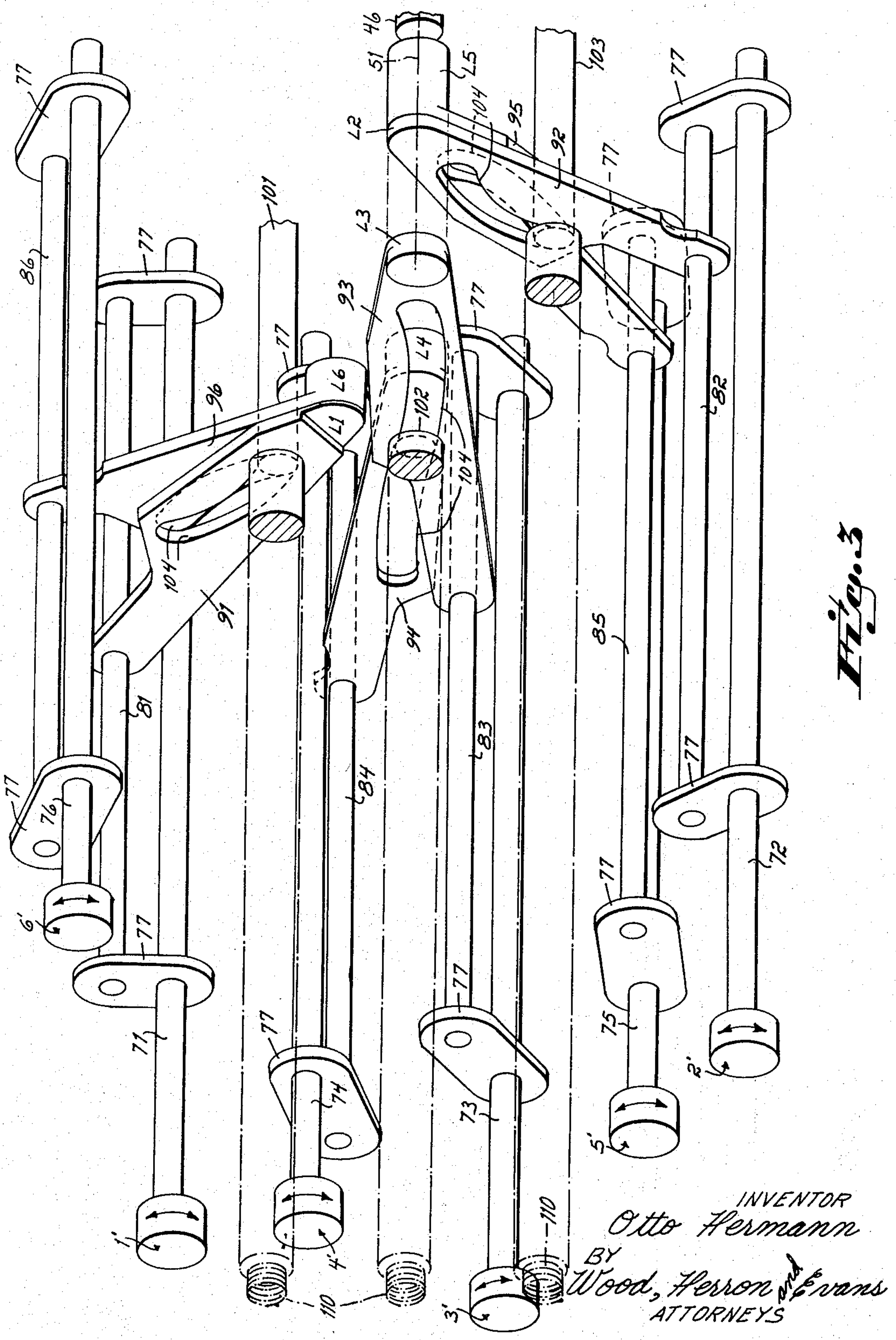
Figure 4:
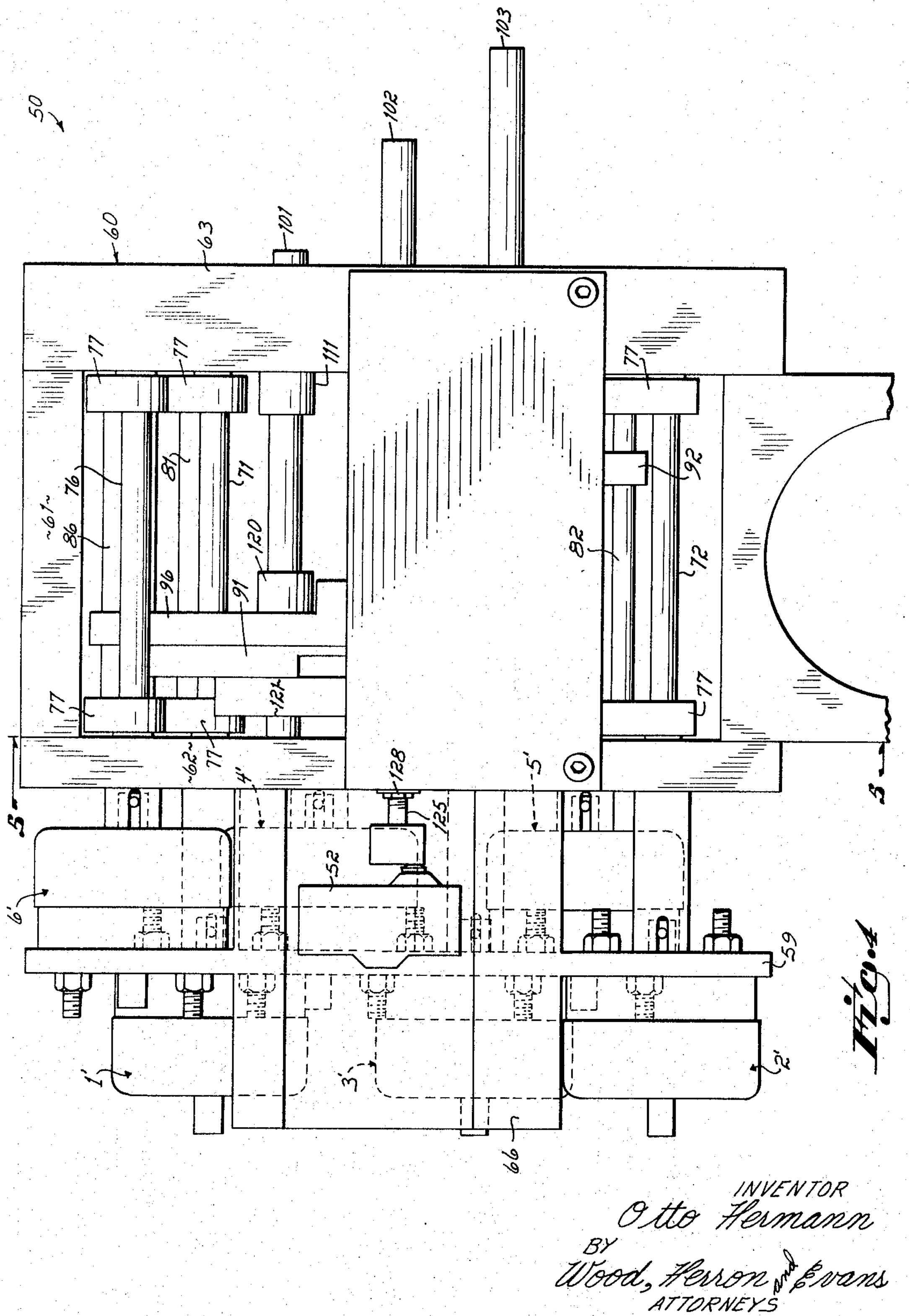
Figure 5:
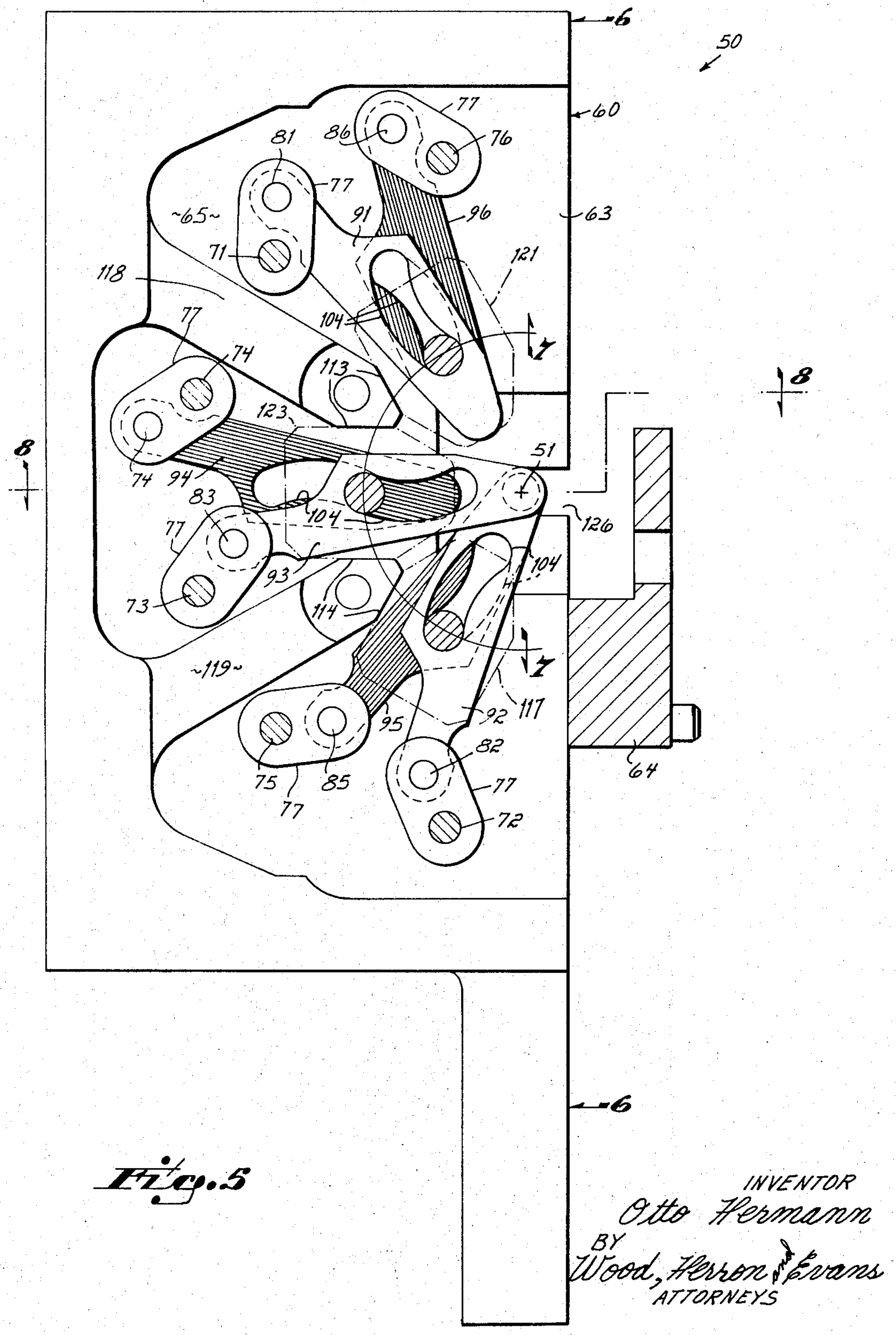
Figure 6:
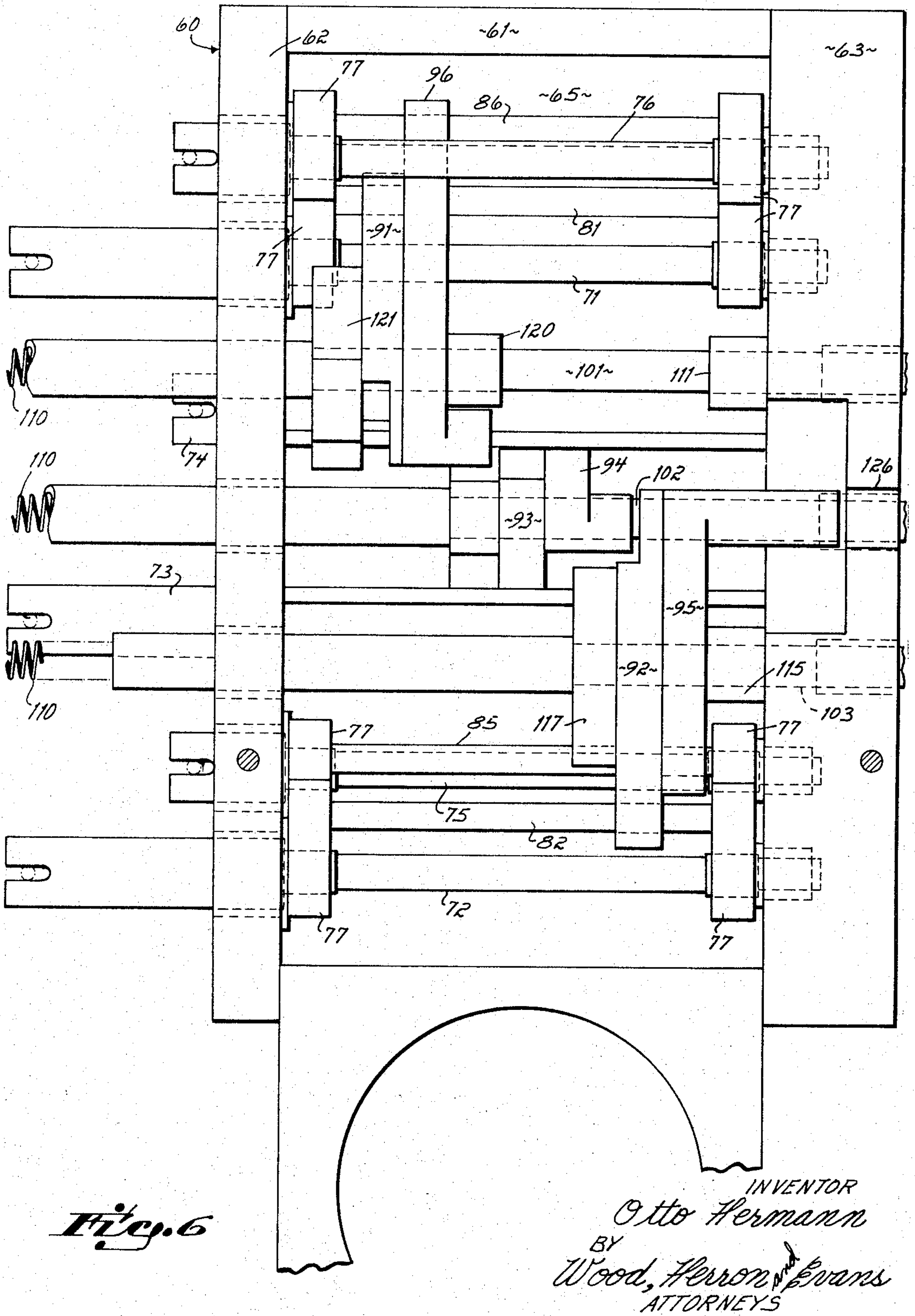
Figure 7:
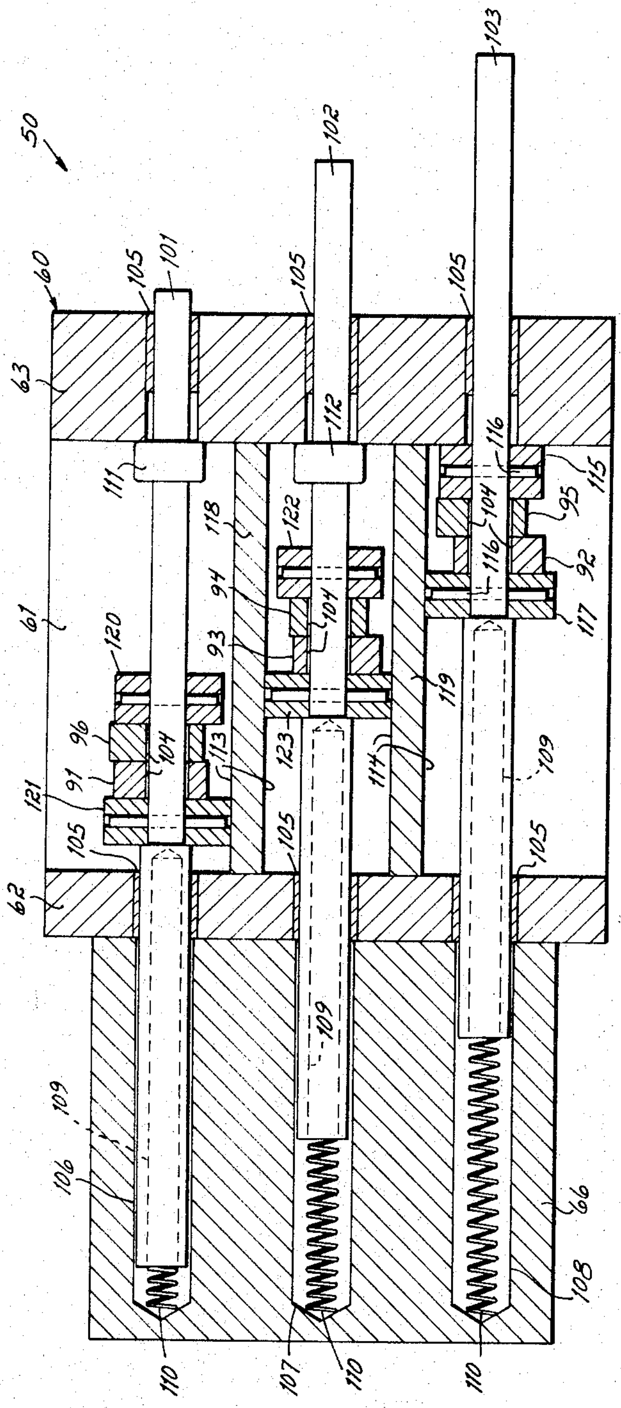
Figure 8:
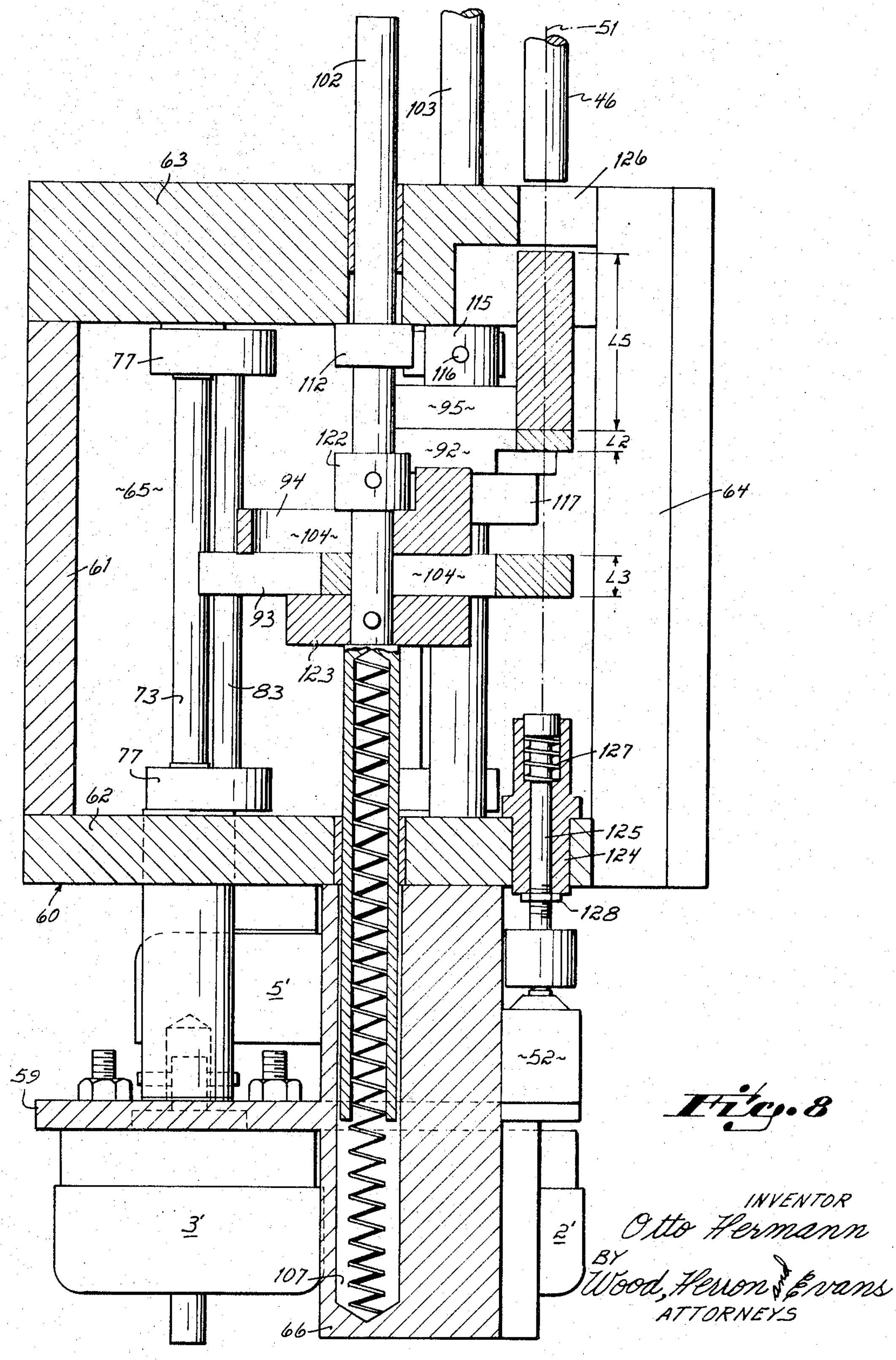
Figure 9:
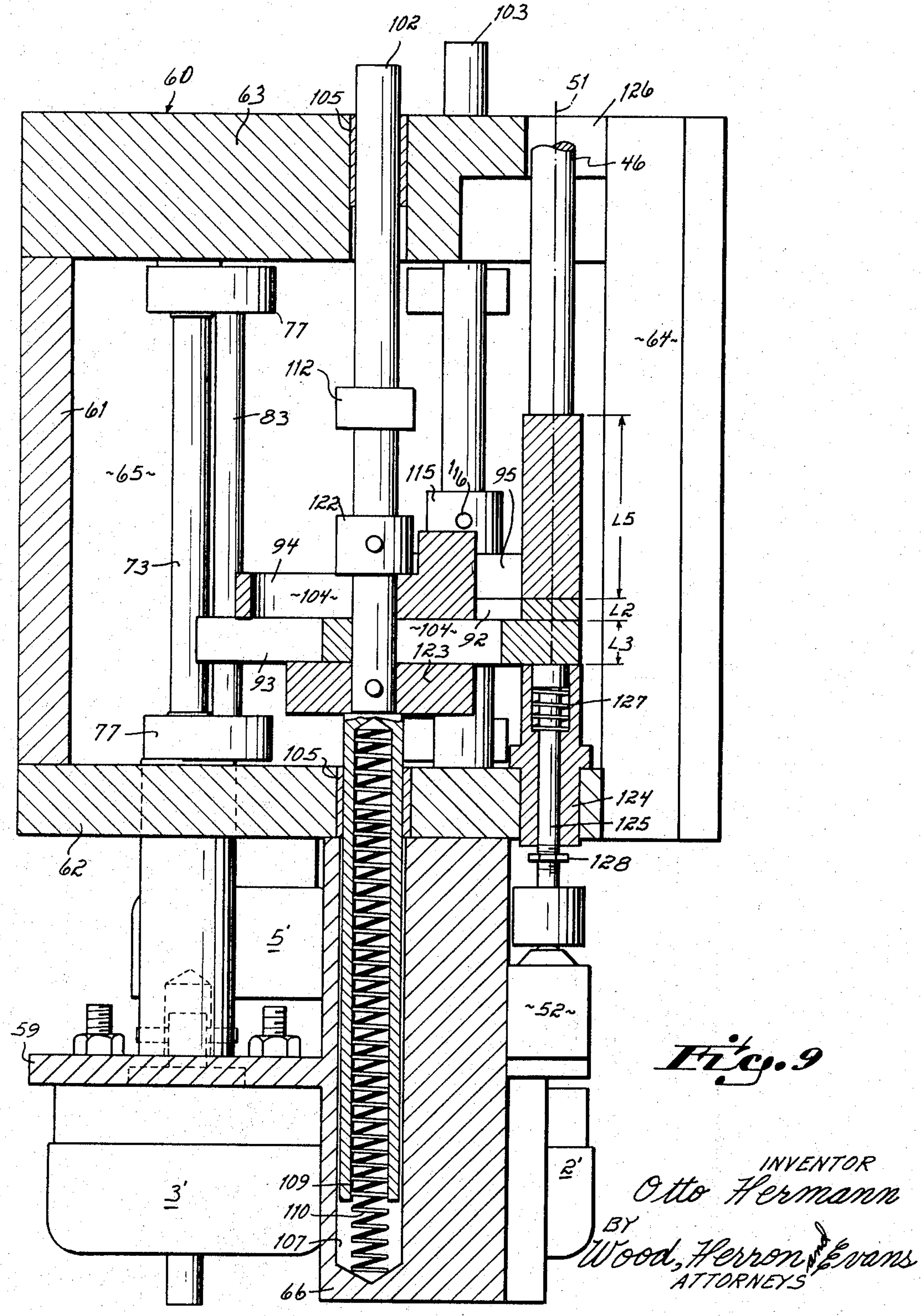
Figures 10, 11:
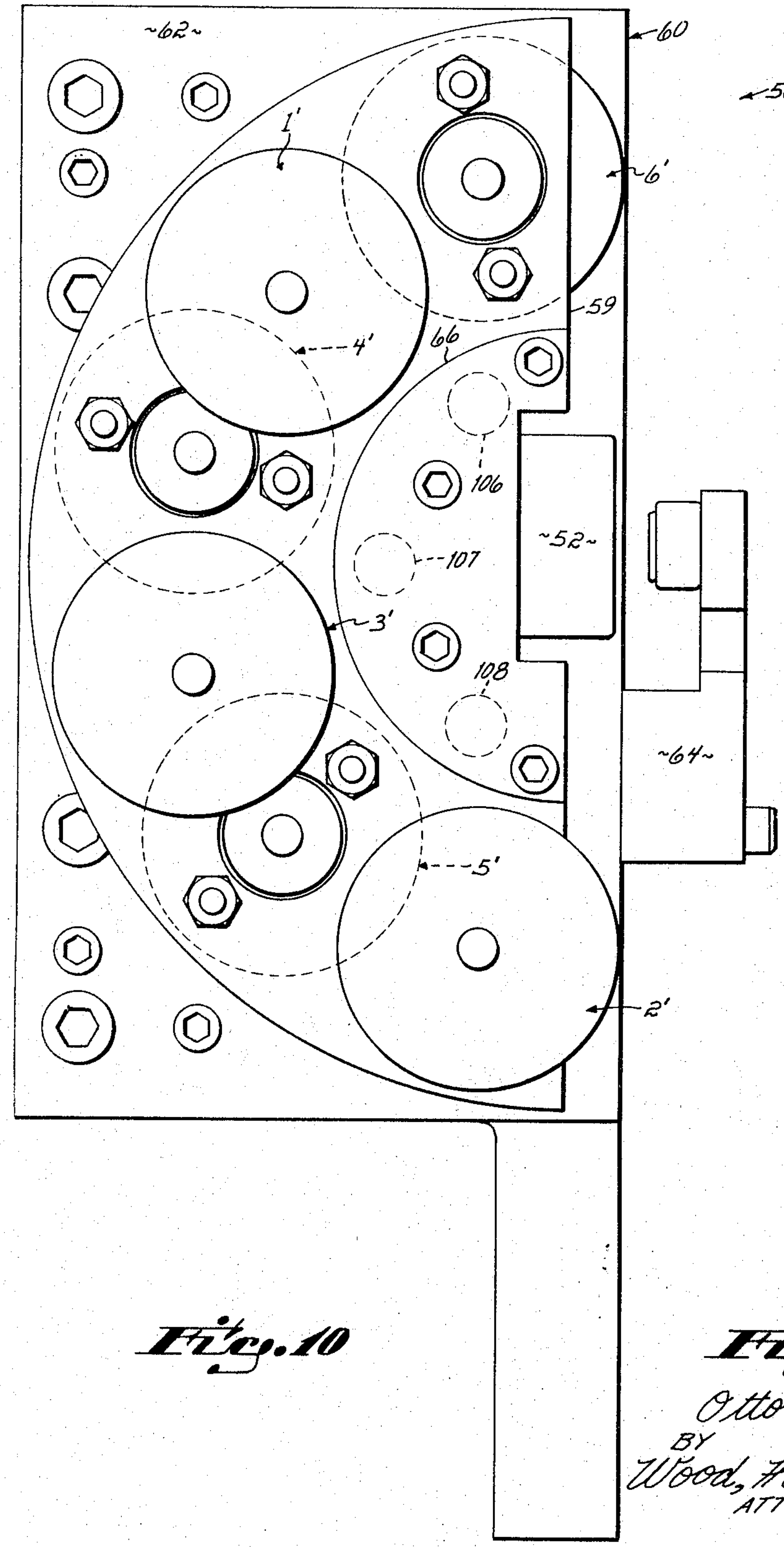

These and other objects and advantages of this invention will be more readily apparent from the following description of the drawings in which:

FIGURE 1 is a perspective view of a lathe incorporating the invention of this application, FIGURE 2 is a diagrammatic illustration of the transmission shifting system of this invention, FIGURE 3 is a perspective view of the portion of the digital selector of this invention, illustrating the relationship of the binarily related selector blocks and the manner in which they are moved into and out of the axis of alignment, FIGURE 4 is a front elevational view of the digital selector unit, FIGURE 5 is a cross-sectional view taken along line 5—5 of FIGURE 4, FIGURE 6 is a front elevational view taken along line 6—6 of FIGURE 5, FIGURE 7 is a cross-sectional layout of the digital selector taken along line 7—7 of FIGURE 5, FIGURE 8 is a top plan cross-sectional view taken along line 8—8 of FIGURE 5, FIGURE 9 is a view similar to FIGURE 8 but illustrating the selector blocks moved into juxtaposition to form a stack of a predetermined length, FIGURE 10 is an end elevational view of the digital selector, and FIGURE 11 is a chart of the activated solenoids or positioning elements required to effect each of the thirty-six different available transmission speed selections.

Referring to FIGURE 1 of the drawings, the invention is illustrated as applied to a lathe 10 having a bed 11, tail stock 12, and a head stock 13. The bed supports a longitudinally movable carriage 14 which in turn supports a transversely movable saddle 15. The saddle 15 carries a cutting tool (not shown) for performing cutting operations on a workpiece supported between the tail stock 12 and a spindle 16 of the head stock 13.

The head stock 13 comprises a housing within which is located the gearing or transmission for driving the spindle 16 at a plurality of different speeds. The particular speed at which the spindle 16 is driven is determined by the setting of a hand wheel 18 carried by the head stock or by the setting of a remote control hand wheel 19 located upon the carriage. In the preferred embodiment illustrated herein, each of these hand wheels is operable to set the spindle at any one of thirty-six different speeds. By utilizing the remote control hand wheel 19 on the carriage of the machine, the operator is enabled to change spindle speeds without leaving his operating station at the carriage.

Referring now to FIGURE 2, it will be seen that spindle speed in any one of the thirty-six available speeds is determined by the positioning of three gear clusters 24, 25 and 26, which are movable under the control of three hydraulic motors 27, 28 and 29 respectively.

The hydraulic motor 27 is operable to position its piston rod 30 in any one of four discrete positions, in each one of which one of the gears of the gear cluster 24 is engaged with an associated gear in the drive system to the spindle. Similarly, each of the pistons 31, 32 of the hydraulic motors 28, 29, respectively, is movable into any one of three discrete positions so as to connect one of the three gears of its associated gear cluster 25, 26, respectively, in driving engagement with a selected gear of the transmission system. The gears which cooperate with the gear clusters 24, 25 and 26 to effect the thirty-six different speed selections have not been illustrated herein since they are conventional and persons skilled in the transmission art will readily be able to supply a gear train to effect these speed changes.

Positioning of the hydraulic motor 27 in each of four different positions and of the hydraulic motors 28 and 29 in each of three different positions is controlled via a slide or shifter valve 35. This valve is selectively movable into any one of thirty-six different discrete positions. In each one of these positions, the slide valve 35 is effective to control movement of the three hydraulic motors 27, 28 and 29 into one of thirty-six different unique combination of positions. In other words, each slide valve position results in the positioning of the hydraulic motor 27 in one of its four available positions and positioning of the hydraulic motors 28 and 29 in one of their three different available positions. Each one of these unique combination positions effects engagement of a unique combination of gears in a continuous gear train so as to drive the spindle in one of thirty-six different available spindle speeds.

A complete description of a slide valve controlled transmission similar to that illustrated diagrammatically in FIGURE 2 may be found in my Patent No. 3,150,537, filed May 12, 1961, and issued Sept. 29, 1964.

Positioning of the slide valve 35 into each of its thirty-six different discrete positions is controlled by a digital selector 50 through a connecting linkage system which, in the preferred embodiment, comprises a hydraulic motor 42 and mechanical linkage system. The linkage includes a rack 36 attached to the slide valve 35 and a pinion 37 driven by a connecting shaft 40 from a rack 38 and pinion 39. Movement of the rack 38 is controlled by a movable hydraulic cylinder 41 of the hydraulic motor 42 to which the rack 38 is rigidly attached. In this drive, the piston 43 of the hydraulic motor 42 is fixed so that pumping of fluid via conduits 44, 45 to opposite sides of the piston results in movement of the cylinder 41 relative to the fixed piston 43. As a consequence of this movement, the attached rack 38 is caused to move relative to the pinion 39 so as to effect rotation of the pinion. This results in rotation of the shaft 40 and thus effects linear movement of the slide valve relative to its associated stationary port system.

As is explained more fully hereinafter, the digital selector unit 50 includes a plurality of variable size positioning elements or blocks movable from an inactive to an active position in the path of movement of a stop bar 46 operatively connected to the slide valve 35 through the cylinder 41 of motor 42. This bar 46 is attached to a rack 47 which is in turn connected via a gear 48 to a rack 49 secured to the cylinder 41 of motor 42. Thus upon movement of the cylinder so as to effect movement of the slide valve 35, the rack 47 and attached stop bar 46 are caused to move into the selector unit causing selected ones of the stop elements to be moved into facial juxtaposition along an axis of alignment 51 to form a stack of a selected length.

After movement of the selected blocks into facial juxtaposition so that the blocks form a stack of a predetermined length, a switch 52 is actuated so as to terminate continued movement of the cylinder 41. This results in the slide valve 35 being left in one of its thirty-six discrete positions so that upon application of fluid under pressure to the valve, the fluid is distributed by the valve to selected ports of each of the three hydraulic motors 27, 28 and 29 so as to effect movement of each of the motors to a selected transmission speed setting position.

In order to minimize the number of selector blocks required to effect a maximum number of stop positions, the effective length of each of the selector blocks is binarily related to the length of each of the other blocks. Thus, the length L2 of the selector block 2 is twice the length L1 of the selector block 1. Similarly, the length L3 of the selector block 3 is twice the length L2 of the selector block 2 and the length L4 of the selector block 4 is twice the length L3 of the selector block 3. Likewise, the length L5 of the selector block 5 is twice the length L4 of the selector block 4. In other words, if the effective length L1 of the selector block 1 is considered to be equal to $2^1$ then the length of the selector block 2 is equal to the $2^2$, L3 is equal to $2^3$, L4 is equal to $2^4$, and L5 is equal to $2^5$. As a consequence of this binary relationship, the five selector blocks 1, 2, 3, 4, 5 provide thirty-two different combinations of additive lengths as may be clearly seen in the chart of FIGURE 11. If the selector block 6 was made twice the length of selector block 5, the six selector blocks would provide sixty-four different additive lengths or stop positions. However, in the preferred embodiment of the transmission illustrated and described herein, only thirty-six speed selections are required. Therefore, the length L6 of the selector block 6 may be the same as the length of one of the other selector blocks in which case it facilitates the selection of as many as forty different additive lengths or stop positions. In the preferred embodiment, the effective length L6 of the selector block 6 has been made the same as the length L4 of selector block 4.

Selection of the selector blocks 1, 2, 3, 4, 5 and 6 so as to move them from an inactive to an active position in which they are located along the axis of alignment 51, is controlled from the remote control selector dial 19 or the head stock selector dial 18 through a series of selector block actuator solenoids 1′–2′–3′–4′–5′–6′ respectively. Each of these solenoids is connected to the selector dials through a conventional control circuit indicated generally by the numeral 53. Since those skilled in this art could readily connect each of the thirty-six speed selection contacts of the dials 18 and 19 to the proper ones of the six solenoids 1′ through 6′ so as to effect the thirty-six different speed selections as is explained more fully hereinafter, this control circuit has not been illustrated and described in detail. A chart indicating the proper solenoids to be actuated to effect each of the thirty-six different speed selections is illustrated in FIGURE 11.

As an alternative to connecting the head stock speed selection dial 18 to the shifter valve 35 through the digital selector 50, the dial 18 may be directly connected to the shifter valve by a mechanical linkage since the shifter valve is located immediately behind the dial within the housing of the head stock 13. This is primarily a matter of design and convenience dependent upon the location of the shifter valve within the housing. However, for remote control of the shifter valve, a direct mechanical linkage is impractical for accurate positioning of the shifter valve.

Referring to FIGURES 3–10, it will be seen that the digital selector 50 comprises a frame 60 having a cast metal main body section 61, a pair of end plates 62, 63 and a front plate 64. This frame defines a central cavity 65 within which the positioning elements 1–5 are mounted for movement into and out of the axis of alignment 51.

The six solenoids 1′–2′–3′–4′–5′–6′ are mounted upon a solenoid mounting flange or plate 59 which extends radially from a central hub 66. This hub 66 extends outwardly from the frame side plate 63 so that the flange 59, hub 66 and side plate 63 define a space within which three 4′–5′–6′ of the six solenoids are mounted. The three other solenoids 1′–2′–3′ are mounted on the other or outer side of the plate 59 in staggered relationship to the solenoids 4′–5′–6′ as may be seen most clearly in FIGURE 10.

Rotary actuator rods 71–76 extend into the recess 65 from each of the rotary solenoids 1′–2′–3′–4′–5′–6′ and are rotatably journaled within the side plates 62, 63 of the selector unit frame. As may be seen most clearly in FIGURE 3, each of the actuating rods 71–76 is connected by a spaced pair of links 77 to a slide rod 81–86, respectively. Each of these links is non-rotatably keyed to the actuator rods 71–76 upon which it is mounted so that upon rotation of the actuator rods, the links 77 and thus the slide bars are rotated about the axis of the actuator rods.

Each of the slide rods 81–86 supports one end of a carrier arm 91–96, respectively, on the other end of which is mounted one of the positioning elements 1–6, respectively. Intermediate its ends, each of the carrier arms 91–96 is mounted for sliding movement toward and away from the axis of alignment 51 upon one of three supporting plungers 101, 102 and 103. Each of these plungers 101, 102 and 103 supports two of the carrier arms so as to permit longitudinal movement of the arms parallel to the axis of alignment as well as movement toward and away from the axis.

Movement of the supporting arms toward and away from the axis 51 is accommodated by a generally arcuate slot 104 in each of the supporting arms through which one of the supporting plungers 101, 102 and 103 extends. Longitudinal movement of the supporting arms is accommodated by longitudinal movement of the supporting plungers 101, 102 and 103.

As may be seen most clearly in FIGURES 7, 8 and 9, each of the supporting plungers 101, 102 and 103 is slidably mounted within bushings 105 in the side plates 62, 63. One end of each of the plungers 101, 102 and 103 extends into and is slidable within one of three parallel bores 106, 107 and 108 machined into the hub 66 of the frame. That end of each of the plungers which resides within the bores 106, 107 and 108 of the hub 66, has an axial bore 109 for reception of a compression spring 110. These springs bias the plungers 101, 102 and 103 outwardly away from the bottom of the bores 106, 107 and 108, respectively. To fix or determine the normal longitudinal position of the plungers 101 and 102 relative to the frame, collars 111 and 112 are mounted over the plungers 101 and 102 and secured thereto by set screws (not shown). The springs 110 normally bias these collars 111 and 112 into engagement with the inside edge of the frame side plates 62.

Longitudinal positioning of the plunger 103 is determined by a collar 115 which normally abuts against the inside edge of the frame plate 63. This collar 115 is secured to the plunger 103 and cooperates with another collar 117 so as to preclude axial movement of the supporting arms 92 and 95 relative to the plunger 103. Both collars 115, 117 are secured to the plunger 103 by conventional taper pins 116.

Spaced collars 120 and 121 on opposite sides of the carrier arms 91, 96 are also pinned to the plunger 101 so as to preclude or limit axial movement of the arms 91, 96 relative to the plunger 101. Similarly, collars 122 and 123 are secured to the plunger 102 and cooperate to preclude axial sliding movement of the carrier arms 93, 94 relative to the plunger 102.

In order to guide longitudinal movement of the collars 117, 121 and 123 and the connected plungers 101, 102 and 103 relative to the frame 60, the collars are engageable with and slidable over guide surfaces 113, 114 of locating fingers 118, 119, respectively. These fingers form a part of the main body 61 and extend into the cavity 65 of the frame 60 as may be seen most clearly in FIGURE 5.

As may be seen most clearly in FIGURE 7, two of the carrier arms 91 and 96 are mounted close to or adjacent to the side plate 63 while two others 92, 95 are mounted adjacent the side plate 62. The remaining two carrier arms 93, 94 are mounted intermediate these side plates so that in no event will the positioning elements 1–6 interfere when moved by the appropriate solenoids and connecting linkage system into the common axis of alignment 51.

After selected ones of the selector blocks 1–6 have been moved into the axis of alignment, they are moved into facial engagement along the axis of alignment 51 in order to form a meaningful length stack of elements. To this end, the stop bar 46 is movable along the axis of alignment 51 through an aperture 126 in the side frame plate 62 and into engagement with the stack of selected elements located in the axis of alignment. Upon continued movement of the bar 46, the selected blocks 1–6, carrier arms 91, 96, and plungers 101, 102 and 103 are forced toward the frame side plate 63 and switch 52 against the bias of the compression springs 110. After all of the selected blocks 1–6 have been forced in facial engagement so as to form a stack along the axis of alignment 51 equal to the combined length of all of the selected blocks, that one of the selected blocks which is closest to the switch 52 (block 3 in FIGURE 9) engages and moves an actuating plunger 125 so as to actuate the switch 52. The plunger 125 is slidably mounted within a sleeve 124 which is in turn secured within the frame side plate 63. The plunger 125 is normally biased outwardly away from the switch 52 by a spring 127. Movement of the plunger 125 required to actuate the switch 52 is controlled by an adjustment nut 128 threaded over the plunger 125 and engageable with one end of the sleeve 126.

*Operation*

To effect rotation of the spindle 16 at a preselected speed, the remote control dial 19 or the head stock dial 18 is first moved to a new speed selection position. As an example, assume that a speed represented by the number 24 in the chart of FIGURE 11 is selected. Thereafter, a shift cycle is initiated by the closing of a switch (not shown) so as to complete a circuit to the solenoids 4′–5′. Energization of these solenoids effects rotation of the connected actuator rods 74 and 75, respectively, so as to effect movement of the slide rods 84 and 85 toward the axis of alignment 51. As a consequence of this movement, the supporting arms 94 and 95 are moved inwardly over the supporting plungers 102 and 103 so as to locate the positioning elements or blocks 4 and 5 in the axis of alignment.

Approximately simultaneously with the energization of the appropriate solenoids to affect a selected speed change, a solenoid valve (not shown) is actuated so as to connect one port 45 of the hydraulic motor 42 to pressure and the other port 44 to exhaust. This results in movement of the cylinder 41 of motor 42 to the right as viewed in FIGURE 2 and movement of the rack 47 and connected pusher rod 46 to the left. By the time the pusher rod has moved far enough to engage the selected positioning elements, the selected elements will have been moved by the rotary solenoids into the axis of alignment. The pusher rod engages the selected positioning elements forcing them to move axially along the axis of alignment 51 until they are all located in facial engagement. Thereafter, continued movement of the complete stack of selected positioning elements results in engagement of one of the elements with the actuating plunger 125 which actuates the clutch 52. Actuation of switch 52 stops the forward movement of the cylinder 41 of hydraulic motor 42 through a conventional solenoid valve control circuit.

As the cylinder 41 moves to the left as viewed in FIGURE 2, it causes rotary movement of the pinions 39 and 37 so as to move the slide valve 35 a distance directly proportional to the distance moved by the cylinder 41. The slide valve is thereafter connected to pressure so that it is operative to supply fluid to selected ones of the ports of each of the hydraulic motors 27, 28 and 29 as explained in U.S. Patent No. 3,150,537. This results in movement of each of these hydraulic motors to one of the multiple positions to which each of these motors is movable to engage one of the connected gear clusters with a selected gear of a continuous gear train.

To select a new spindle speed, the cylinder 41 of motor 42 is moved to the left as viewed in FIGURE 2 so as to withdraw the plunger 46 from the selector unit 50. Upon complete withdrawal of the plunger 46 so that it no longer may interfere with positioning of the selector blocks 1–6, a switch 130 is actuated, indicating that a new selection cycle may be initiated. Alternatively, if spindle speed preselection is desired, a conventional master-slave piston and cylinder arrangement (not illustrated) may be substituted for the single hydraulic motor 42. If this is done, the master cylinder is used to withdraw and reposition the plunger 46 while the slave cylinder and connected shifter valve remain in position until the work cycle is completed. Thereafter, upon completion of the work cycle, the slave cylinder and connected shifter valve move into the new position as determined by the repositioned master cylinder.

While the digital selector of this application has been disclosed in the preferred embodiment as being controlled by selector dials 18, 19, it will be appreciated by those skilled in this art that it may be remotely controlled from any source of command signals such as push button keyboards, tape controls etc. In fact, this selector is particularly advantageous for use with a tape control unit because it accepts digital command inputs, such as those derived from digital tape controls, without the necessity for first converting the command signal into an analogue signal before it may be accepted by the control system. This is a decided advantage over analogue positioning control systems, such as synchronous servo motors, which require an analogue signal to effect a preselected or commanded movement.

While only a single preferred embodiment of the invention of this application has been disclosed and described herein, those skilled in the art to which this invention pertains will readly apprecate numerous changes and modifications which may be made without departing from the scope of the invention. Therefore, I do not intend to be limited except by the scope of the appended claims.

Having described my invention, I claim:

1. In a machine tool, a shifting arrangement for a geared transmission which comprises, a plurality of shiftable members each operatively connected to one of the shiftable gears of said transmission, a multi-position fluid motor connected with each of said members, a movable valve operative to control the position of each of said fluid motors, the improvement which comprises a positioning apparatus for controlling the position of said valve, said positioning apparatus including a frame, a plurality of positioning elements movably mounted upon said frame, one dimension of each of said elements being binarily related to a corresponding dimension of all of the other of said elements, said elements being selectively movable between an inactive to an active position, each of said elements being alignable when in the active position with all of the other of said elements when said other elements are in the active position, said one dimension of said elements being located in an axis of alignment when said elements are in said active position, said elements being selectively movable into juxtaposition in said axis of alignment to form a stack having a predeterminned dimension which is a function of the sum of said binarily related dimensions of said selected elements.

2. In a machine tool, a shifting arrangement for a geared transmission which comprises, a plurality of shifting members each operatively connected to one of the shiftable gears of said transmission, a multi-position fluid motor connected with each of said members, a linearly movable valve plate operative to control the position of each of said fluid motors, the improvement which comprises a remotely controlled speed selector for controlling the position of said valve member, said speed selector including a frame, a plurality of positioning stop elements movably mounted upon said frame, electrically actuated means for selectively moving said positioning elements from an inactive to an active position, each of said elements being alignable in an axis of alignment when in the active position with all of the other of said elements when said other elements are in the active position, means for moving said selected elements into juxtaposition in said axis of alignment to form a stack having a predeterminend additive length, remote control speed selection means for controlling said electrical actuator means so as to move selected ones of said elements into said axis of alignment, and means interconnecting said valve member and said speed selector and operative to position said valve member in accordance with the length of the stack of the selected elements located in said axis of alignment.

3. Positioning apparatus comprising, a supporting frame, a plurality of positioning elements movably mounted upon said frame, one dimension of each of said elements being binarily related to a corresponding dimension of all of the other of said elements, said elements being selectively movable between an inactive and an active position, each of said elements being alignable when in the active position with all of the other of said elements when said other elements are in the active position, said one dimension of said elements being located in an axis of alignment when said elements are in said active position, said elements being selectively movable into juxtaposition in said axis of alignment to form a stack having a predetermined dimension which is a function of the sum of said binarily related dimensions of said selected elements.

4. Positioning apparatus comprising, a supporting frame, a plurality of positioning elements movably mounted upon said frame, one dimension of each of said elements being binarily related to a corresponding dimension of all of the other of said elements, actuators for selectively moving said elements between an inactive to an active position, each of said elements being alignable when in the active position with all of the other of said elements when said other elements are in the active position, said one dimension of said elements being located in an axis of alignment when said elements are in said active position, and a stop member movable along said axis of alignment to move selected ones of said elements located in said axis of alignment into juxtaposition to form a stack having a predetermined dimension which is a function of the sum of said binarily related dimensions of said selected elements.

5. Positioning apparatus comprising, a supporting frame, a plurality of positioning elements movably mounted upon said frame, one dimension of each of said elements being binarily related to a corresponding dimension of all of the other of said elements, said elements being selectively movable between an inactive to an active position, each of said elements being alignable when in the active position with all of the other of said elements when said other elements are in the active position, said one dimension of said elements being located in an axis of alignment when said elements are in said active position, means for selectively moving said elements into juxtaposition in said axis of alignment to form a stack having a predetermined dimension which is a function of the sum of said binarily related dimensions of said selected elements.

6. The positioning apparatus of claim 5 wherein said moving means comprises an electrically actuated solenoid operatively associated with each of said positioning elements.

7. A digital selector for positioning a movable member in a plurality of different positions, said selector comprising, a frame, a plurality of rotary solenoids mounted upon said frame, a plurality of rotatable actuator rods supported by said frame, one of said actuator rods being operatively connected to each of said solenoids so that actuation of said solenoids affects rotation of said actuator rods, a plurality of slide rods, each of said slide rods being mounted upon and supported from one of said actuator rods, a plurality of carrier arms, each of said carrier arms being slidably supported at one end by one of said slide rods for longitudinal movement relative thereto, a plurality of supporting plungers mounted upon said frame for longitudinal movement relative thereto, each of said plungers being operatively connected to at least one of said carrier arms so as to control the longitudinal positioning of said carrier arms relative to said frame, and a plurality of positioning elements, each of said positioning elements being mounted upon the opposite end from said one end of each of said carrier arms, the length of at least three of said positioning elements being different but binarily related to the length of the others of said positioning elements, said elements being seletcively movable under the control of said solenoids into a common longitudinal axis of alignment, and being longitudinally movable along said axis to form a stack of elements having a length which is a function of the sum of the lengths of said seletced elements.

8. A digital selector for positioning a movable member in a plurality of different positons, said selector comprising, a frame, a plurality of solenoids mounted upon said frame, a plurality of rotatable actuator rods supported by said frame, one of said actuator rods being operatively connected to each of said solenoids so that actuation of said solenoids effects rotation of said actuator rods, a plurality of carrier arms, each of said carrier arms being operatively connected to one of said actuator rods, and a plurality of positioning elements, each of said positioning elements being mounted upon one of said carrier arms, said elements being selectively movable under the control of said solenoids into a common longitudinal axis of alignment, and being longitudinally movable along said axis to form a stack of elements having a length which is a function of the sum of the lengths of said selected elements.

9. The selector of claim 8 wherein at least three of said positioning elements are of different lengths, and the lengths of each of said elements are a binary function of the lengths of the others of said elements.

10. The selector of claim 8 wherein each of said solenoids is a rotary solenoid.

11. In a machine tool, a shifting arrangement for a geared transmission which comprises, a plurality of shiftable members each operatively connected to one of the shiftable gears of said transmission, a multi-position motor connected with each of said shiftable members, a control member operative to control the position of each of said motors, the improvement which comprises a positioning apparatus for controlling the position of said control member, said positioning apparatus including a frame, a plurality of positioning elements movably mounted upon said frame, said elements being selectively movable between an inactive and an active position, each of said elements being alignable when in the active position with all of the other of said elements when said other elements are in the active position, said elements being selectively movable into juxtaposition in said axis of alignment to form a stack having a predetermined additive length which is a function of the sum of the lengths of said selected elements.

12. A digital selector for positioning a movable member in a plurality of different positions, said selector comprising, a frame, a plurality of motor means mounted upon asid frame, a plurality of rotatable actuator rods supported by said frame, one of said actuator rods being operatively connected to each of said motor means so that actuation of said motor means effects rotation of said actuator rods, a plurality of carrier arms, each of said carrier arms being operatively connected to one of said actuator rods, and a plurality of positioning elements, each of said positioning elements being mounted upon one of said carrier arms, said elements being selectively movable under the control of said motor means into a common longitudinal axis of alignment, and being longitudinally movable along said axis to form a stack of elements having a length which is a function of the sum of the lengths of said selected elements.

References Cited

UNITED STATES PATENTS

| | | | |
|---|---|---|---|
| 2,788,675 | 4/1957 | Hosea | 74—335 |
| 3,198,027 | 8/1965 | Ramsel et al. | 74—364 |
| 3,273,413 | 9/1966 | Stobbe et al. | 74—364 |
| 3,280,651 | 10/1966 | Hermann | 74—365 |

ROBERT A. O'LEARY, *Primary Examiner.*

H. S. LAYTON, *Assistant Examiner.*